US012387698B2

(12) United States Patent
Stewart

(10) Patent No.: US 12,387,698 B2
(45) Date of Patent: Aug. 12, 2025

(54) CHANTER OF A WIND INSTRUMENT

(71) Applicant: Shane Darren Stewart, Whangarei (NZ)

(72) Inventor: Shane Darren Stewart, Whangarei (NZ)

( * ) Notice: Subject to any disclaimer, the term of this patent is extended or adjusted under 35 U.S.C. 154(b) by 242 days.

(21) Appl. No.: 18/269,310

(22) PCT Filed: Dec. 22, 2021

(86) PCT No.: PCT/IB2021/062152

§ 371 (c)(1),
(2) Date: Jun. 23, 2023

(87) PCT Pub. No.: WO2022/137142

PCT Pub. Date: Jun. 30, 2022

(65) Prior Publication Data

US 2024/0046904 A1 Feb. 8, 2024

(30) Foreign Application Priority Data

Dec. 23, 2020 (NZ) ........................................ 771482
Aug. 24, 2021 (NZ) ........................................ 779347

(51) Int. Cl.
*G10D 9/10* (2020.01)
*G10D 9/02* (2020.01)

(52) U.S. Cl.
CPC ................. *G10D 9/10* (2020.02); *G10D 9/02* (2013.01)

(58) Field of Classification Search
CPC ................................... G10D 9/10; G10D 9/02
See application file for complete search history.

(56) References Cited

U.S. PATENT DOCUMENTS 3,476,006 A 11/1969 Wright
2014/0331849 A1 11/2014 Kinnaird
2020/0327873 A1 10/2020 Duncan
(Continued)

FOREIGN PATENT DOCUMENTS

AU 2018100975 A4 * 8/2018
ES 2215444 A1 10/2004
ES 2215444 B1 * 10/2006 ............... G10D 9/01
(Continued)

OTHER PUBLICATIONS

International Search Report and Written Opinion of International Searching Authority with date of completion of Jan. 31, 2022 for International Application No. PCT/IB2021/062152.

*Primary Examiner* — Robert W Horn
(74) *Attorney, Agent, or Firm* — JCIP; Joseph G. Chu

(57) ABSTRACT

A chanter of a wind instrument is disclosed. The chanter comprises a bulb 106 and a chimney section 102. The bulb 106 or at least a portion thereof is located adjacent and around an external surface or wall 103b of the chimney section 102 of the chanter. At least a portion of the bulb 106 is spaced apart from the chimney section 102 thereby forming or defining a gap around at least a portion of the external surface or wall 103b of the chimney section 102 and at least a portion of an internal surface 104a of the bulb 106 or the upper section 104. Such arrangement allows for free vibrations of the chimney section 102 that is proximal to the chimney reed of the chanter thereby allowing the vibrancy of the sound to be increased.

20 Claims, 8 Drawing Sheets

(56) References Cited

U.S. PATENT DOCUMENTS

| | | | | |
|---|---|---|---|---|
| 2024/0046904 | A1 * | 2/2024 | Stewart | G10D 7/063 |

FOREIGN PATENT DOCUMENTS

| | | | | | |
|---|---|---|---|---|---|
| FR | 2518292 | A1 | * | 6/1983 | G10D 9/01 |
| GB | 1176987 | A | * | 1/1970 | G10D 7/063 |
| GB | 2219122 | A | * | 11/1989 | G10D 7/063 |
| GB | 2344923 | A | | 6/2000 | |
| TW | M540369 | U | | 4/2017 | |

* cited by examiner

CHANTER OF A WIND INSTRUMENT

The present invention relates to a wind instrument. More particularly but not exclusively it relates to a chanter of a bagpipe.

BACKGROUND OF THE INVENTION

Wind instruments such as bagpipe or practice chanters are well known. Such musical instruments produce sound by a vibrating column of air, either using a reed or lips of the musician. The melody pipe or chanter of such wind instruments has finger holes (or sound holes) that are played to produce the tune. A chanter allows the user to control the melody.

Traditionally chanters of such wind instruments are made as one complete piece with no joins in the fabrication, be it traditional wooden chanters or the more modern injection moulded chanters. Also, there are no gaps between the chimney (shaft) and the top portion of the chamber to reduce the length of connection of the chimney and the top portion (bulb/tenon joint). This is shown in FIG. 1. Whilst such known chanters provide the purpose of playing the sound and controlling the melody, the vibrancy of the sound produced is not as desired.

Also, such known chanters are not as reliable in performance as desired especially with weaker, easier to blow chanter reeds which tend to make a squeal sound on the lower notes (e.g. on the lowest 2 notes) of the chanter when playing quick top hand notes or transitioning from the higher notes (e.g. from the highest 2 notes) to the lower notes (e.g. to the lowest 2 notes).

OBJECT OF THE INVENTION

It is an object of the present invention to provide a chanter of a wind instrument which overcomes or at least partially ameliorates some of the abovementioned disadvantages and/or which at least provides the public with a useful choice.

Alternately or additionally, it is an object of the present invention to provide a chanter of a bagpipe which overcomes or at least partially ameliorates some of the abovementioned disadvantages and/or which at least provides the public with a useful choice.

STATEMENTS OF THE INVENTION

In a first aspect, the invention resides in a chanter of a wind instrument, the chanter comprising:

- a chimney section that is substantially tubular (and/or has a hollow interior region) and extends from a first end portion of the chimney section to a second end portion of the chimney section or vice-versa and has an internal wall (internal surface) and an external wall (external surface), the second end portion located opposite the first end portion; and
- a top section at which a chanter reed is located or is configured to be located, at least a portion of the top section is located adjacent and around the external wall of the chimney section, and is spaced apart from the chimney section thereby forming or defining a gap or an empty space between at least a portion of the external wall of the chimney section and at least a portion of an inner surface of the top section.

In one embodiment, the gap or the empty space extends from a lower end of the top section that is proximal to the second end portion towards the direction of an upper end of the top section that is proximal to the first end portion.

In one embodiment, the top section located proximal to the first end portion.

In one embodiment, the top section is more proximal to the first end portion than to the second end portion.

In one embodiment, the top section is more distal to the second end portion than to the first end portion.

In one embodiment, at least the lower end of the top section does not contact the external wall of the chimney section due to the gap or the empty space.

In one embodiment, the gap or the empty space extends from the lower end towards the direction of the upper end for at least a quarter of the total distance between the lower end and upper end.

In one embodiment, the gap or the empty space does not extend fully from the lower end to the upper end.

In one embodiment, the top section is located at or proximal to the first end portion.

In one embodiment, the top section extends from the first end portion towards the second end portion.

In one embodiment, the top section extends from the first end portion towards the second end portion along less than quarter of the total length of the chimney section.

In one embodiment, the top section comprises or forms a bulb of a chanter, wherein the bulb or at least a portion thereof is located adjacent and around the external wall of the chimney section and is spaced apart from the chimney section so that the gap or the empty space is formed or defined around the external wall of the chimney section and at least a portion of an inner surface of the bulb.

In one embodiment, the chimney section has a non-uniform wall thickness along its length.

In one embodiment, the wall thickness of the chimney section tapers from the first end portion to or towards the second end portion.

In one embodiment, the chanter reed is configured to be located within a reed seat that is part of or is coupled with the top section.

In one embodiment, the chanter reed is a single reed or a double reed.

In one embodiment, the top section comprises or forms a tenon of the chanter that is located at or proximal to the first end portion of the chimney section.

In one embodiment, the chanter reed is configured to be located within a reed seat that is part of or is coupled with the tenon.

In one embodiment, the bulb is integrally formed with the tenon.

In one embodiment, the top section and the chimney section are two separate pieces.

In one embodiment, the tenon and the chimney section are two separate pieces.

In one embodiment, the top section is integrally formed with the chimney section.

In one embodiment, the tenon is integrally formed with the chimney section.

In one embodiment, the external wall of the chimney section comprises a neck region at a portion that is adjacent to the gap or the empty region.

In one embodiment, the wall thickness of the neck region is less than the wall thickness of portions of the external wall immediately above the neck region.

In one embodiment, the wall thickness of the neck region is less than the wall thickness of portions of the external wall immediately below the neck region.

In one embodiment, the neck region is substantially trapezoidal in cross-section at a plane that is parallel to a longitudinal axis of the chimney section along which the chimney section extends from the first end and the second end or vice-versa.

In one embodiment, the chanter or at least one or more components of the chanter is made out of carbon fibre.

In one embodiment, the bulb is hollow cylindrical in shape.

In one embodiment, the tenon is tubular or hollow cylindrical in shape.

In one embodiment, at least an internal diameter of the bulb is larger than at least an internal diameter of the tenon.

In one embodiment, at least an external diameter of the bulb is larger than at least an external diameter of the tenon.

In one embodiment, an internal and/or an external diameter of the tenon is larger than an internal and/or an external diameter of the chimney section.

In one embodiment, at least an internal diameter of the tenon is larger than at least an internal diameter of the chimney section at or proximal to the first end portion.

In one embodiment, at least an external diameter of the tenon is larger than the at least an external diameter of the chimney section at or proximal to the first end portion.

In one embodiment, at least an internal diameter of the chimney section at the second end portion is larger than at least the internal diameter of the tenon.

In one embodiment, at least an internal diameter of the chimney section at the second end portion is larger than at least the external diameter of the tenon.

In one embodiment, an internal and/or an external diameter of the chimney section tapers from the first end portion to or towards the second end portion.

In one embodiment, a sole of the chanter is located at or proximal to the second end portion.

In one embodiment, a plurality of sound holes is formed along the chimney section.

In one embodiment, the chimney section or the external wall of the chimney section comprises a neck region at a portion that is adjacent to the empty space or the gap.

In one embodiment, the wall thickness of the neck region is less than the wall thickness of portion of the chimney section immediately above the neck region.

In one embodiment, the wall thickness of the portion of the chimney section immediately below the neck region.

In one embodiment, a further or second empty space or second gap is formed at a lower portion of the neck region, the second empty space being in addition to a first empty space (the first empty space being said empty space or said gap).

In one embodiment, the second empty space is in the form of a cavity or a recess.

In one embodiment, the second empty space is formed at the chimney section between its internal wall and external wall.

In one embodiment, the second empty space extends along the longitudinal axis of the chimney section from a portion that is adjacent to the lower end of the top section (or from the portion that is adjacent to a lower end of the bulb) towards the direction to the second end of the chimney section.

In one embodiment, the second empty space extends to only a part of total length of the chimney section.

In one embodiment, the second empty space extends only a part of total distance between the lower end of the top section or lower end of the bulb and the second end of the chimney section.

In one embodiment, the second empty space merges with or is coalesce to the first empty space or the gap thereby forming a single empty space or a single gap.

In one embodiment, the second empty space is fully enclosed between the internal wall and the external wall of the chimney section.

In one embodiment, the second empty space is adjacent to the first empty space and extends parallel to the first empty space towards the direction to the second end of the chimney section.

In one embodiment, width of the second empty space may be non-uniform or inconsistent.

In one embodiment, a barrel or barrel region is formed at a portion where the second empty space is formed.

In a second aspect, the invention resides in a chanter of a wind instrument, the chanter comprises a chimney section, the chimney section of the chanter being substantially tubular (and/or has a hollow interior region) extending longitudinally from a first end portion of the chimney section to a second end portion of the chimney section or vice-versa, the chimney section is configured to receive a blown air through the first end portion, and the second end portion is located opposite the first end portion, wherein the chanter further comprises a bulb, the bulb of the chanter or at least a portion thereof is located adjacent and around an external wall (external surface) of the chimney section and is spaced apart from the chimney section thereby forming or defining a gap or an empty space around at least a portion of the external wall of the chimney section and at least a portion of an internal wall (internal surface) of the bulb.

In one embodiment, the chimney section has a non-uniform wall thickness along its length.

In one embodiment, the wall thickness of the chimney section tapers from the first end portion to or towards the second end portion.

In one embodiment, the chanter reed is configured to be located within a reed seat that is part of or is coupled with the top section.

In one embodiment, the top section comprises a tenon of the chanter that is located at or proximal to the first end portion of the chimney section.

In one embodiment, the chanter reed is configured to be located within a reed seat that is part of or is coupled with the tenon.

In one embodiment, the bulb is integrally formed with the tenon.

In one embodiment, the top section and the chimney section are two separate pieces.

In one embodiment, the tenon and the chimney section are two separate pieces.

In one embodiment, the top section is integrally formed with the chimney section.

In one embodiment, the tenon is integrally formed with the chimney section.

In one embodiment, the external wall of the chimney section comprises a neck region at a portion that is adjacent to the gap.

In one embodiment, the wall thickness of the neck region is less than the wall thickness of portions of the external wall immediately above the neck region.

In one embodiment, the wall thickness of the neck region is less than the wall thickness of portions of the external wall immediately below the neck region.

In one embodiment, the neck region is substantially trapezoidal in cross-section at a plane that is parallel to a longitudinal axis of the chimney section along which the chimney section extends from the first end and the second end or vice-versa.

In one embodiment, the chanter or at least one or more components of the chanter is made out of carbon fibre.

In one embodiment, an internal and/or an external diameter of the bulb is larger than an internal and/or external diameter of the tenon.

In one embodiment, an internal and/or an external diameter of the tenon is larger than an internal and/or an external diameter of the chimney section.

In one embodiment, an internal and/or an external diameter of the tenon is larger than the an internal and/or an external diameter of the chimney section at the first end portion.

In one embodiment, an internal and/or an external diameter of the tenon is smaller than the internal diameter of the chimney section at the second end portion.

In one embodiment, an internal and/or an external diameter of the chimney section tapers from the first end portion to or towards the second end portion.

In one embodiment, a sole of the chanter is located at or proximal to the second end portion.

In one embodiment, a plurality of sound holes is formed along the chimney section.

In one embodiment, the gap/empty space extends from a lower end of the top section that is proximal to the second end portion towards the direction of an upper end of the top section that is proximal to the first end portion.

In one embodiment, at least the lower end of the top section does not contact the external wall of the chimney section due to the gap/empty space.

In one embodiment, the gap/empty space extends from the lower end towards the direction of the upper end for at least a quarter of the total distance between the lower end and upper end.

In one embodiment, the gap/empty space does not extend fully from the lower end to the upper end.

One of more statements of the first aspect as described above may equally apply to the second aspect.

In a third aspect, the invention resides in a chanter of a wind instrument, the chanter comprising a bulb and a chimney section, the bulb of the chanter or at least a portion thereof is located adjacent and around an external wall (external surface) of the chimney section of the chanter, at least a portion of the bulb being spaced apart from the chimney section thereby forming or defining a gap or an empty space around the external wall of the chimney section and at least a portion of an internal surface of the bulb.

In one embodiment, the gap or the empty space extends around the external wall of the chimney section and at least a portion of an internal surface of the a tenon of the chanter, the tenon being coupled with or is integrally formed with the bulb.

One of more statements of the first aspect and/or second aspect as described above may equally apply to the third aspect.

In a fourth aspect, the present invention resides in a bagpipe chanter, the bagpipe chanter comprises a chimney section that is substantially tubular in shape (and/or has a hollow interior region) extending longitudinally from a first end portion of the chimney section to a second end portion chimney section or vice-versa, wherein the chimney section is configured to receive a blown air through the first end portion and the second end portion is configured to be located opposite the first end portion, wherein the bagpipe chanter further comprises a bulb, the bulb of the chanter or at least a portion thereof is located adjacent and around an external wall (external surface) of the chimney and is spaced apart from the chimney thereby forming a gap or an empty space around the external surface of the chimney and at least a portion of an internal wall (internal surface) of the bulb.

One of more statements of the first aspect and/or second aspect as described above may equally apply to the fourth aspect.

In a fifth aspect, the present invention resides in a bagpipe that comprises a chanter as described in any one of the statements above.

In a sixth aspect, the present invention resides in a practice chanter instrument that comprises a chanter as described in any one of the statements above, and a mouthpiece coupled with the chanter.

In a seventh aspect, the invention resides in a musical instrument comprising a chanter as defined in any one of the statements above, wherein the musical instrument is selected from any one of the following:

i. a bagpipe; and ii. a practice chanter.

In one embodiment, the practice chanter further comprises a mouth piece that is coupled to the chanter as defined in any one of the statement above.

Other aspects of the invention may become apparent from the following description which is given by way of example only and with reference to the accompanying drawings.

The entire disclosures of all applications, patents and publications, cited above and below, if any, are hereby incorporated by reference.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

As used herein the term "and/or" means "and" or "or", or both.

As used herein "(s)" following a noun means the plural and/or singular forms of the noun.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings and described in the following description are simply exemplary embodiments of the invention. Hence, specific dimensions and other physical characteristics related to the embodiments disclosed herein are not to be considered as limiting.

It is acknowledged that the term "comprise" may, under varying jurisdictions, be attributed with either an exclusive or an inclusive meaning. For the purpose of this specification, and unless otherwise noted, the term 'comprise' shall have an inclusive meaning, allowing for inclusion of not only the listed components or elements, but also other non-specified components or elements. The terms 'comprises' or 'comprised' or 'comprising' have a similar meaning when used in relation to the system or to one or more steps in a method or process.

As used hereinbefore and hereinafter, “(s)” following a noun means the plural and/or singular forms of the noun.

When used in the claims and unless stated otherwise, the word ‘for’ is to be interpreted to mean only ‘suitable for’, and not for example, specifically ‘adapted’ or ‘configured’ for the purpose that is stated.

The entire disclosures of all applications, patents and publications, cited above and below, if any, are hereby incorporated by reference.

BRIEF DESCRIPTION OF THE DRAWINGS

The invention will now be described by way of example only and with reference to the drawings in which.

DETAILED DESCRIPTION OF THE INVENTION

Figure 1:
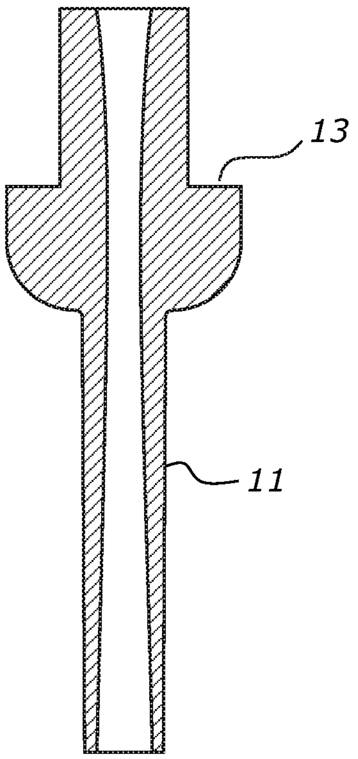
FIGURE 1 prior art
FIG. 1: is a cross-sectional view on an upper region of a known chanter.

FIG. 1 shows a cross-sectional view on an upper region of a known chanter of a wind instrument/woodwind instrument such as a bagpipe or a practice chanter instrument. As shown in FIG. 1 and as mentioned above, known chanters are made as one complete piece with no joins and in the fabrication. Also, there is no gap/empty space between the chimney 11 and the top portion 13 of the chanter to reduce the length of connection of the chimney 11 and the top portion 13. Due to such arrangements, the vibrancy and projection of the sound is produced especially due to a damping effect in the upper region of the chanter which is not desirable.

The performance of such known chanters is also not as reliable.

It is therefore desirable to have a chanter that provides an overall increase in the vibrancy and projection of tone. Also, it is desirable to have a chanter that is reliable in performance which negates or reduces a squeal sound on the lower notes (e.g. on the lowest 2 notes) when playing the quick top hand notes or transitioning from the higher notes (e.g. from the highest 2 notes) to the lower notes (e.g. to the lowest 2 notes).

With reference to FIGS. 2 to 5, in which similar features are generally indicated by similar numerals, a chanter 100 for a wind instrument such as a bagpipe or a practice chanter instrument according to a first aspect of the invention.

Figure 2:
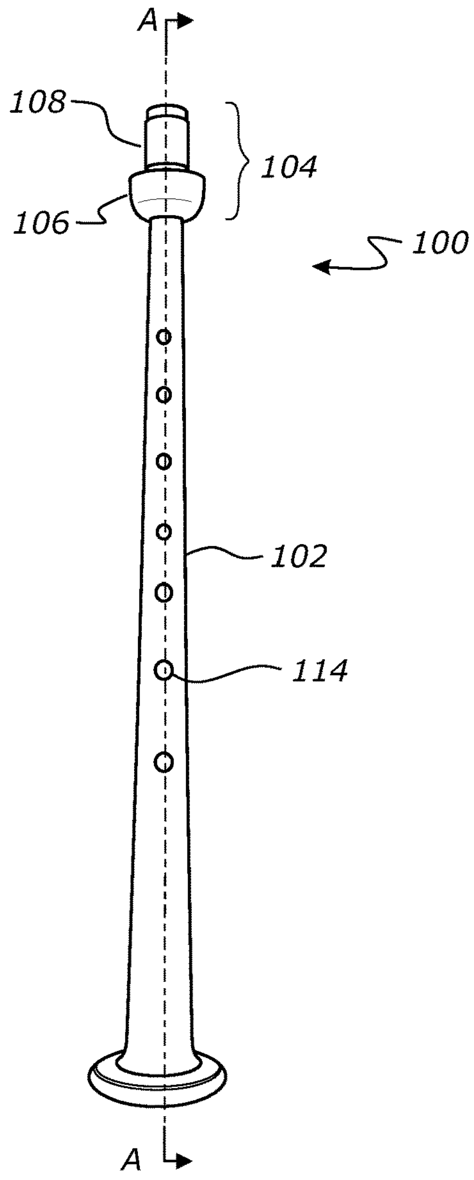
FIG. 2: shows a chanter according to a first embodiment of the present invention.

As shown, the chanter 100 comprises a chimney (hereinafter referred to as a chimney section 102), and a top section 104. The chimney section 102 is substantially tubular (and/or has a hollow interior region) and extends from a first end portion 102*a* of the chimney section 102 to a second end portion 102*b* of the chimney section 102 or vice-versa and has an internal wall 103*a* (i.e., internal surface) and an external wall 103*b* (i.e., external surface). FIG. 2 also shows a longitudinal axis A-A along which the chimney section 102 of the chanter 100 extends. A blown air is configured to be received by the chimney section 102 through the first end portion 102*a* and the second end portion 102*b* that is located opposite the first end portion 102*a*.

Figure 3:
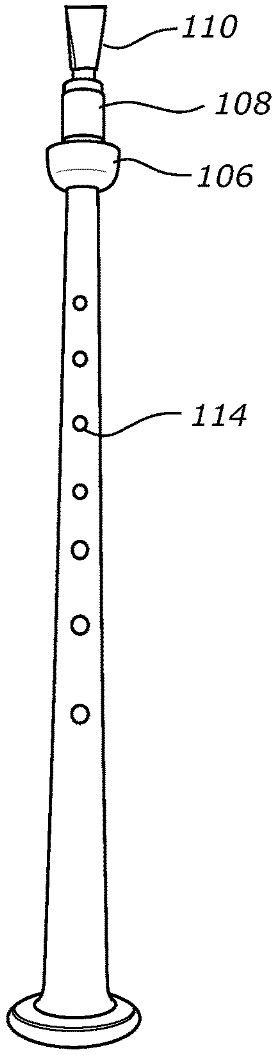
FIG. 3: shows the chanter of FIG. 2 with a chanter reed.

The top section 104 is the section where the chanter reed 110 or at least a portion of the chanter reed 110 is located or is configured to be located. This is shown in FIG. 3. The chanter reed 110 may be part of the chanter 100. The top section 104 is also referred to as a seal of the chanter as at least a portion of the top section 104 is configured to sealingly engage with a chanter stock (if the instrument is a bagpipe) or with a mouthpiece (if the wind instrument is a practice chanter or similar).

A skilled person will know what a chanter reed 110 is and therefore it need not be described here in detail. But, in general, the chanter reed 110 is the portion that vibrates as air is passed through thereby creating the characteristic sound of the wind instrument such as a bagpipe or a practice chanter instrument. A plurality of sound holes 114 are formed along the chimney section 102 as shown.

Figure 4:
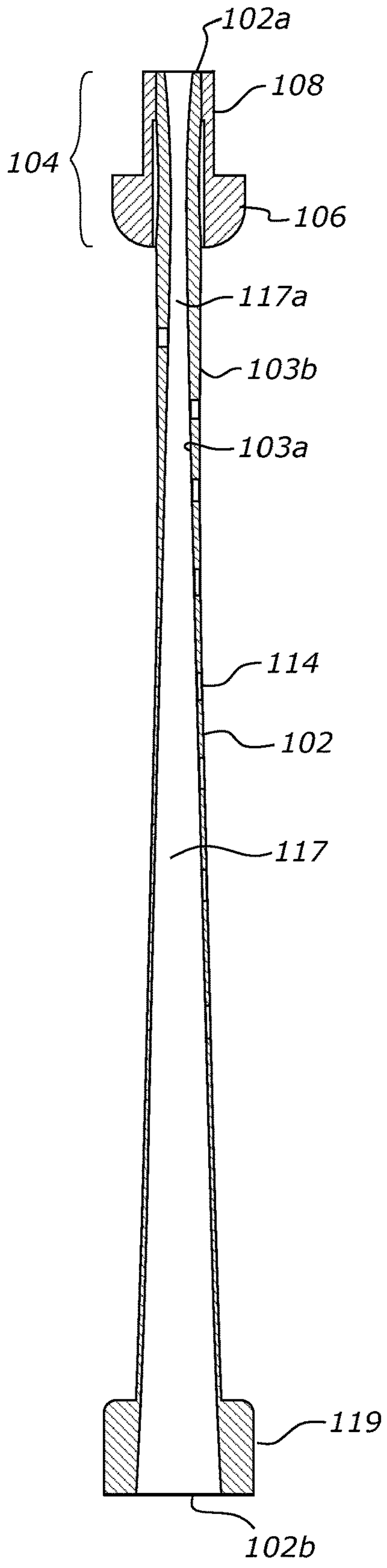
FIG. 4: shows a cross-sectional view of the chanter of FIG. 2 along A-A axis.
Figure 5:
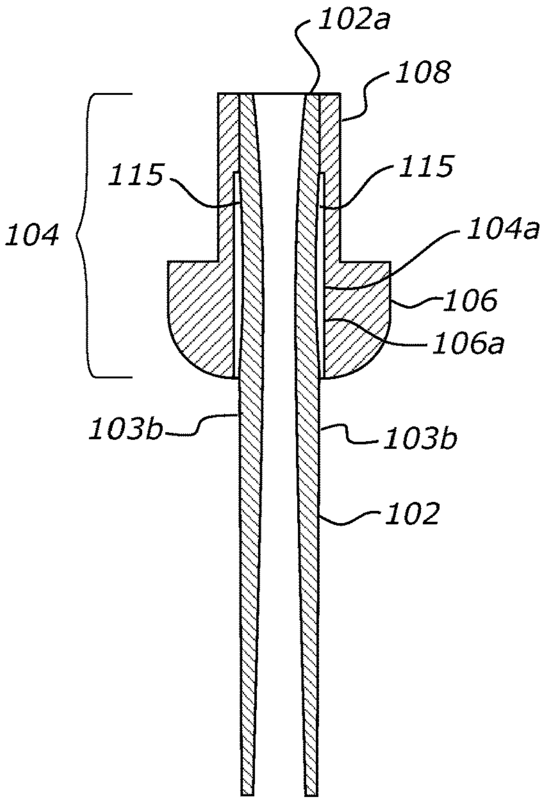
FIG. 5: is a detailed view of the upper region of the chanter of FIG. 4.

FIG. 4 is a cross-sectional view of the chanter 100 of FIG. 2 along the longitudinal axis A-A. FIG. 5 is a detailed view of the upper region of the chanter 100 of FIG. 3.

As shown in FIGS. 4 and 5, at least a portion of the top section 104 are located adjacent or around the external wall 103*b* of the chimney section 102. The top section 104 are spaced apart from the chimney section 102 thereby forming or defining a gap 115 (i.e. empty space/void region) between the external wall 103*b* of the chimney section 102 and at least a portion of the inner surface 104*a* of the top section 104. As shown, the inner surface 104*a* faces towards the external wall 103*b* of the chimney section.

The top section 104 may be located at or proximal to the first end portion 102*a* of the chimney section 102. The top section 104 are located more proximal to the first end position 102*a* than to the second end portion 102*b*. The top section 104 is located more distal to the second end portion 102*b* than the to the first end portion 102*a*.

As shown, the top section 104 extends from the first end portion 102*a* towards (i.e. towards the direction) of the second end portion 102*b*. Preferably, the top section 104 extends from the first end portion 102*a* towards the second end portion 102 along less than a quarter of the total length of the chimney section 102.

As shown in FIGS. 2 to 5, the top section 104 comprises a bulb 106 of the chanter 100. A skilled person will readily appreciate what a bulb of a chanter is, but in general, is the portion that is configured to abut against a chanter stock (if the instrument is a bagpipe) to or with a mouthpiece (if the wind instrument is a practice chanter or similar) during use.

As shown in FIGS. 4 and 5, at least the portion of the bulb 106 is located adjacent and around the external wall 103*b* of the chimney section 102 and is spaced apart from the chimney section 102 so that the gap 115 is formed around the external wall 103*b* of the chimney section 102 and at least the inner surface 106*a* of the bulb 106.

As shown the chimney section 102 has a non-uniform wall thickness. The wall thickness of the chimney section 102 tapers from the first end portion 102*a* to the second end portion 102*b*.

As shown in FIGS. 4 and 5, the internal surface, i.e, internal walls 103*a* of the chimney section 102 are non-parallel (or non-uniform in cross section that is orthogonal to the longitudinal axis of the chimney section 102) so that a bore 117 defined by the internal walls 103*a* is non-uniform in size (e.g substantially conical) along the length of the chimney section 102. The internal walls 103*a* of the chimney section 102 are non-parallel so that the bore 117 has a throat portion 117*a* (or internal walls 103*a* of the chimney section 102 defines a throat portion 117*a*) which is the narrowest portion of the bore 117 (or narrowest portion defined by the internal walls 103*a* of the chimney section). The throat portion 117*a* is located between the first end portion 102*a* and the second end portion 102*b* of the chimney section 102. The widest portion of the bore 117 or the widest portion defined by the internal walls 103*a* of the chimney section 102 is located at or proximal to the second end portion 102*b*. The throat portion 117*a* of the bore 117 is located at the region of the chimney section that is adjacent to the bulb 106. Portion of the bore 117 at the first end portion 102*a* is narrower than the portion of the bore at the second end portion 102*b* but wider than the throat portion 117*a*.

Alternatively, in some embodiments, the internal wall 103*a* may be parallel (or "cylindrical") for the full length of the chimney section 102 and/or the full length of the chanter 100 so that the hollow region/bore 117 is uniform size throughout the length of the chimney section 102. In other words, the internal walls 103*a* of the chimney section 102 may be uniform in cross section that is orthogonal to the longitudinal axis of the chimney section 102.

The top section 104 further comprises a tenon 108 of the chanter 100 that is located at or proximal to the first end portion 102*a* of the chimney section 102. The chanter reed 110 is configured to be located within a reed seat 112 that is part of or is coupled with the top section 104, more specifically the tenon 108. A skilled person will know what a tenon 108 of a chanter is, but in general, it is that portion of the chanter that is configured to be sealingly engage with a chanter stock (if the instrument is a bagpipe) or with a mouthpiece (if the wind instrument is a practice chanter or similar). The chimney section 102 is configured to be held in place via the tenon 108 and at least for that reason, the tenon 108 is located above the bulb 106 and is narrower than the bulb 106. So, the tenon 108 may also be referred to as a neck of the top section 104. The outside/external diameter of the tenon 108 is less than the outside/external diameter of the bulb 106. In one embodiment, the internal and/or the external diameter of the bulb is larger than an internal and/or external diameter of the tenon. In one embodiment, the internal and/or the external diameter of the tenon 108 is larger than the internal and/or the external diameter of the chimney section 102. In one embodiment, the internal and/or the external diameter of the tenon 108 is larger than the internal and/or the external diameter of the chimney section 102 at or proximal to the first end portion 102*a*. In one embodiment, the internal and/or the external diameter of the tenon 108 is smaller than the internal diameter of the chimney section 102 at or proximal to the second end portion 102*b*. So, internal diameter of the chimney section 102 at the second end portion 102 is larger than the internal and/or external diameter of the tenon 108.

In one embodiment, the internal and/or the external diameter of the chimney section 102 tapers from the first end portion 102*a* to or towards the second end portion 102*b*.

The bulb 106 and/or the tenon 108 need not necessarily be of the same shape as shown in FIGS. 4 and 5 and could be of many other suitable shapes.

It is most preferred that the top section 104 and the chimney section 102 are two separate pieces and are bonded to each other using suitable bonding means such as adhesives or similar. Similarly, the tenon 108 and the chimney section 102 are also two separate pieces. The bulb 106 is integrally formed with the tenon 108.

As shown in FIGS. 4 and 5, due to the gap 115 in the chanter 100 of the present invention the length of the connection of the chimney section (shaft) to the top section 104 (the bulb 106 and tenon 108) is significantly reduced. Such a reduction in the length of connection or contact area between the chimney section 102 and at least the portion of the top section 104 means an increase in the vibrating length of the chimney section 102. Hence, it can be appreciated that the present invention can allow free vibrations of the chimney section 102 close/proximal to the chimney reed 110 (e.g. as close/proximal to the chimney reed 110 as possible). With such arrangements, the sound that is generated using the chanter 100 of the present invention can be more vibrant as compared to the sound made using the previously known chanters with arrangements as shown in FIG. 1.

Preferably, the chanter 100 or at least some of the components of the chanter 100 is made out of carbon fibre to enhance its strength. Alternatively, the chanter 100 or at least the components thereof may be made out of many other suitable materials such as but not limited to a polymeric material (e.g. injection moulded plastic), African Blackwood or other suitable timber.

A sole 119 of the chanter 100 is located at or proximal to the second end portion 102*b* of the chimney section 102.

Figure 6:
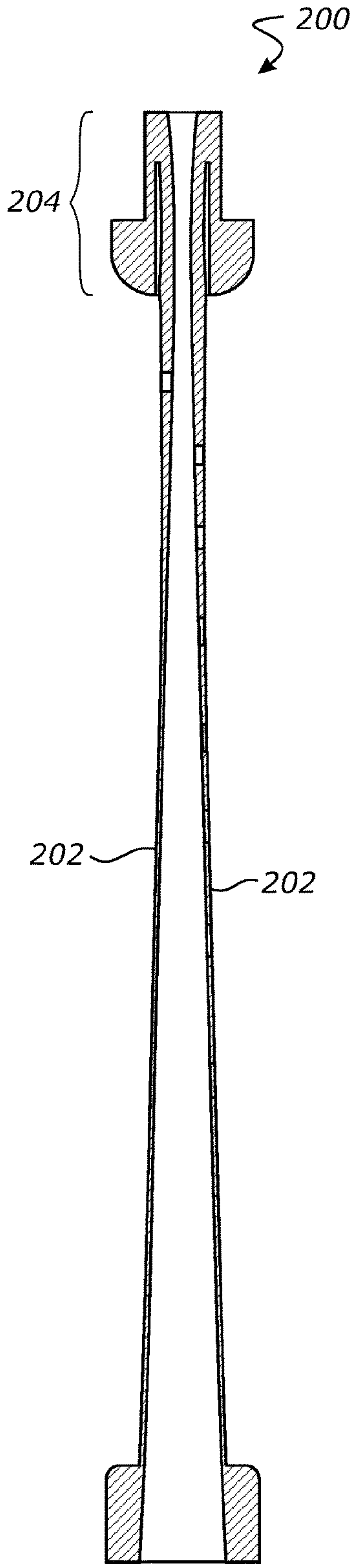
FIG. 6: is a cross-sectional view of a chanter according to a second embodiment of the present invention.
Figure 7:
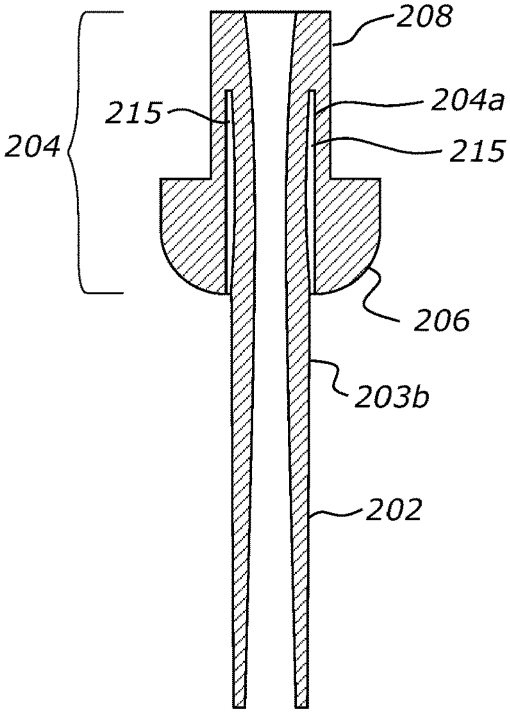
FIG. 7: is a detailed view of the upper region of the chanter of FIG. 6.

Alternatively, the top section 204 may be integrally formed with the chimney section 202 as shown in the cross-sectional view of a further embodiment of the chanter 200 in FIGS. 6 and 7. Apart from the top section 204 being integrally formed with the chimney section 202, the chanter 200 of FIGS. 6 and 7 are substantially the same as the chanter 100 as described above. The difference between chanter 100 and chanter 200 can be determined by comparing FIGS. 4 and 5 with FIGS. 6 and 7 respectively. In FIGS. 6 and 7, the features that are similar to those shown in FIGS. 4 and 5 are identified with the same reference numeral, incremented by 100. Most of the description of the apparatus 100 of a preferred embodiment above, equally applies to the apparatus 700 and therefore and therefore need not be described again in too much detail. Only the main features will be discussed.

As shown in FIGS. 6 and 7, the top section 204 is spaced apart from the chimney section 202 thereby forming a gap 215 or empty region between the external wall 203*b* of the chimney section 202 and the inner surface 204*a* of the top section 204. In FIGS. 6 and 7, it is shown that the top section is integrally formed with the chimney section (i.e. as a one piece). However, the embodiment shown in FIG. 3 is most preferred than the embodiment shown in FIG. 5 as the chimney section that is bonded to the top section (which is a separate piece than the chimney section) provides better performance.

Figure 8:
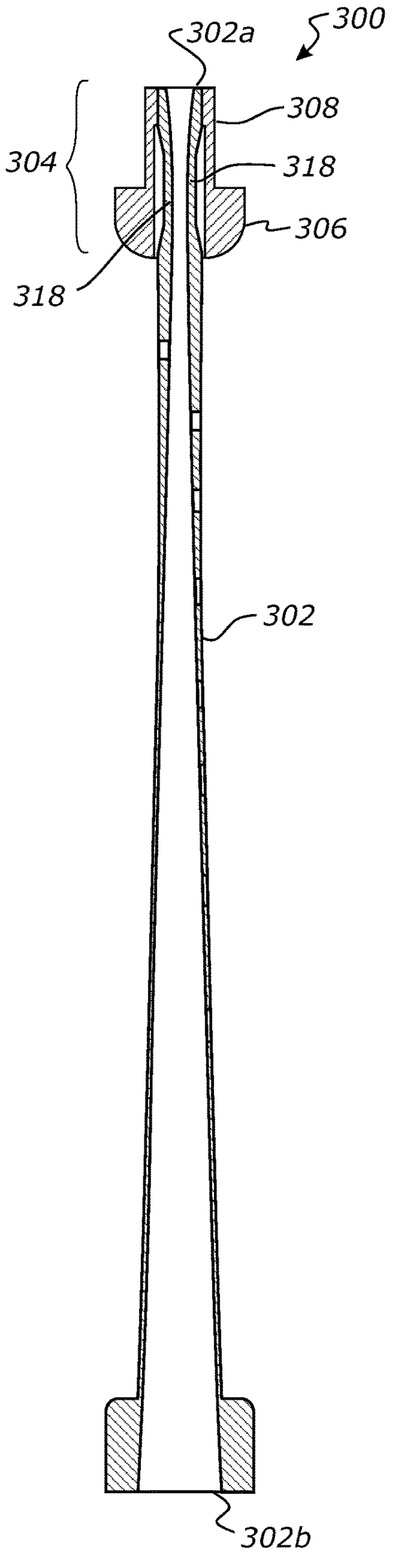
FIG. 8: is a cross sectional view of a chanter according to a third embodiment of the present invention.
Figure 9:
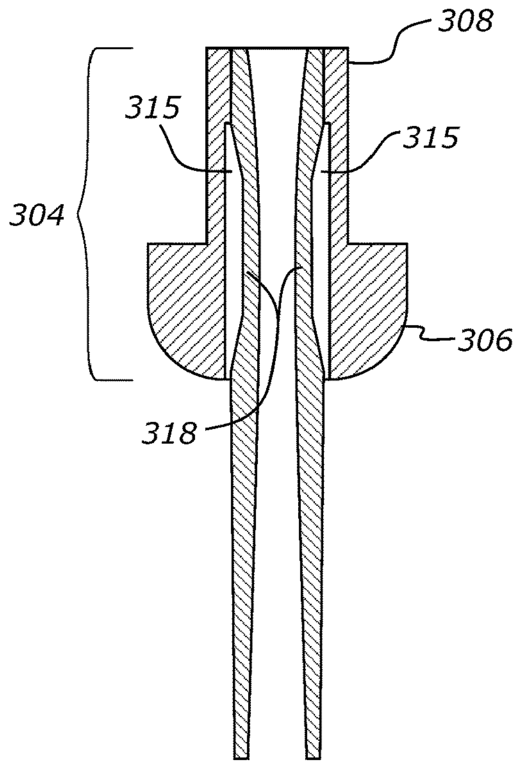
FIG. 9: is a detailed view of the upper region of chanter of FIG. 8.

FIG. 8 is a cross-section view of a chanter 300 according to a further embodiment of the present invention. FIG. 9 is a detailed view of the upper region of the chanter 300 shown in FIG. 8. Chanter 300 is essentially the same as chanter 100 as described above and therefore most of the descriptions above relating to chanter 100 equally applies to chanter 300. In FIGS. 8 and 9, the features that are similar to those shown in FIGS. 4 and 5 are identified with the same reference numeral, incremented by 200. As such only the differences will be described in detail or only the main features will be discussed.

The differences between chanter 100 and chanter 300 can be determined by comparing FIGS. 4 and 5 with FIGS. 8 and 9 respectively.

As shown, in chanter 300, the chimney section or the external wall of the chimney section comprises a neck region 318 at a portion that is adjacent to the empty space/gap 315. The wall thickness of the neck region 318 is less than the wall thickness of portion 321 of the chimney section immediately above the neck region 318 and preferably also the thickness of the portion 323 of the chimney section below the neck region 318.

In one embodiment, the neck region 318 is substantially trapezoidal in cross-section at a plane that is parallel to a longitudinal axis of the chimney section 302 along which the chimney section 302 extends from the first end 302*a* to the second end 302*b* or vice-versa.

Having a neck region 318 is advantageous as it can reduce the mass of the material or reduce the total mass of the chanter and can help to aid/enhance the vibrancy.

Figure 10:
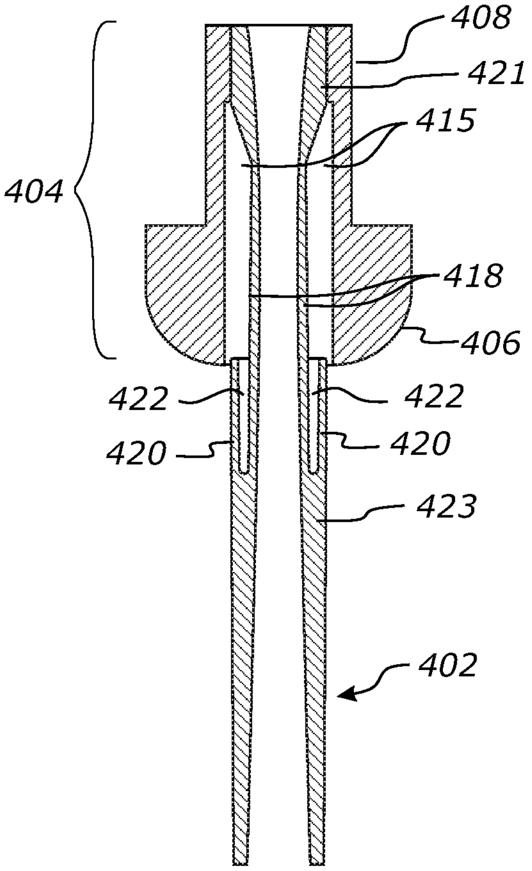
FIG. 10: is a detailed view of the upper region of a chanter according to a fourth embodiment of the present invention.

FIG. 10 is a cross-section view of a portion (more specifically the upper region) of a chanter according to a further embodiment of the present invention. FIG. 10 may also be referred to as a detailed view of an upper region of a chanter of a further embodiment of the present invention. As shown, the upper region includes the top section 404 and also a portion of the chimney section proximal to that top section 404. In FIG. 10, the features that are similar to those shown in FIGS. 4 and 5 are identified with the same reference numeral, incremented by 300.

The differences between chanter 100 and chanter of the embodiment of FIG. 10 can be determined by comparing FIGS. 4 and 5 with FIG. 10. Apart from the upper region as shown in FIG. 10, the rest of the chanter in this embodiment may be identical to the chanter 100 of FIG. 4.

As shown, in the embodiment of FIG. 10, the chimney section or the external wall of the chimney section 402 comprises a neck region 418 at a portion that is adjacent to the empty space/gap 415. The wall thickness of the neck region 418 is less than the wall thickness of portion 421 of the chimney section immediately above the neck region 418 and preferably also the wall thickness of the portion 423 of the chimney section immediately below the neck region 418.

At a lower portion of the neck region 418, there is a further/second empty space or gap 422. This second empty space may be in the form of a cavity or a recess. This second empty space 422 is in addition to the first empty space (gap 415). The second empty space 422 is formed at the chimney section 402 between its internal wall 403*a* and external wall 403*b*. The second empty space 422 extends along the longitudinal axis of the chimney section 402 from a portion that is adjacent to the lower end of the top section 404 (more specifically, from the portion that is adjacent to lower end of the bulb 406) towards the direction to the second end of the chimney section 402. The second end of chimney section is the end that is distal to the top section 404. The second empty space 422 extends only a part of the total length of the chimney section 402. The second empty space 422 extends only a part of the total distance between the lower end of the top section 404 (more specifically, lower end of the bulb 406) and the second end of the chimney section 402. The second empty space 422 opens up to the gap 415 thereby forming a single gap/empty space. In order words, the second empty space 422 merges with/is coalesce to the gap 415 thereby forming a single gap/empty space.

Figure 11:
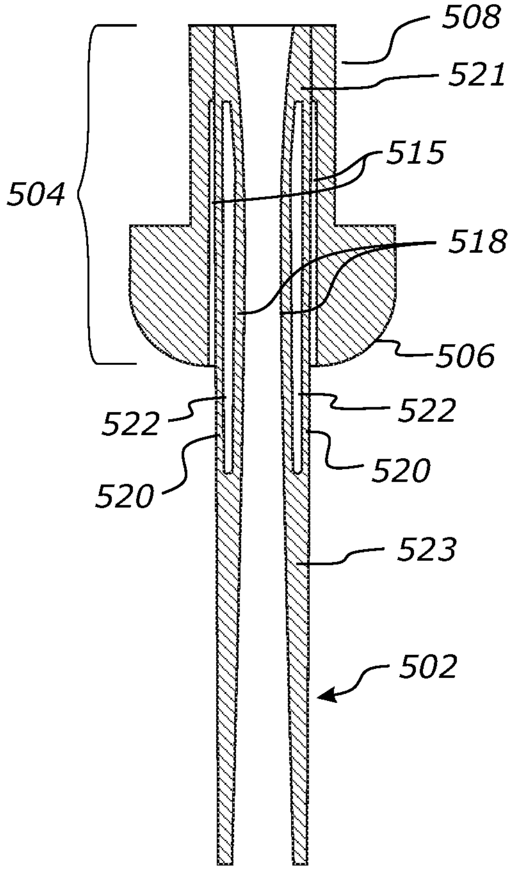
FIG. 11: is a detailed view of the upper region of a chanter according to a fifth embodiment of the present invention.

FIG. 11 is a cross-section view of a portion (more specifically the upper region) of a chanter according to a further embodiment of the present invention. FIG. 11 may also be referred to as a detailed view of an upper region of a chanter of a further embodiment of the present invention. As shown, the upper region includes the top section 504 and portion of the chimney section proximal to that top section 504. In FIG. 11, the features that are similar to those shown in FIGS. 4 and 5 are identified with the same reference numeral, incremented by 400.

The differences between chanter 100 and chanter of FIG. 11 can be determined by comparing FIGS. 4 and 5 with FIG. 11. Apart from the upper region as shown in FIG. 11, the rest of the chanter in this embodiment is identical to the chanter 100 of FIG. 4.

As shown, in the embodiment of FIG. 11, the chimney section 502 or external wall of the chimney section 502 comprises a neck region 518 at a portion that is adjacent to the empty space/gap 515. The wall thickness of the neck region 518 is less than the wall thickness of portion 521 of the chimney section immediately above the neck region 518 and preferably also the wall thickness of the portion 523 of the chimney section immediately below the neck region 518.

Between the internal wall 503*a* and external wall 503*b* of the chimney section 502, there is a further/second empty space or gap 522. This second empty space 522 is in addition to the first empty space, the first empty space (gap 515). The second empty space 522 is fully enclosed between the internal wall 503*a* and the external wall 503*b* of the chimney section 502. The second empty space 522 is adjacent to the gap 515 and extends parallel to the gap 515 towards the direction to the second end of the chimney section 502. The second end of chimney section is the end that is distal to the top section 504. The second empty space 522 is longer than the gap 515. The width of the second empty space is non-uniform or inconsistent. The second empty space 522 extends only a part of the total length of the chimney section 502. Unlike in the embodiment of FIG. 10, second empty space 522 does not merge with nor is coalesce to the gap 515, as the second empty space 522 is enclosed between the internal wall 503*a* and external wall 503*b* of the chimney section.

What is common between the embodiments of FIGS. 10 and 11 is that each of them comprise a second empty space 422, 522 between the internal and external walls of the chimney section. Therefore, each of them form a barrel/barrel region 420, 520 at a portion where such second empty space is formed. As shown, in the embodiment of FIG. 10, a partial length or shorter barrel/barrel region 420 whereas in the embodiment of FIG. 11, a full length or longer barrel/barrel region 530 is formed. Having such a barrels or barrel regions allow extension of the neck region in each of those embodiments. The barrels also cover the neck region from the view and therefore is also aesthetically pleasing/appealing. Furthermore, having a barrel/barrel region can also help to maintain the strength of the chanter at the neck region. For example, having a full length or longer barrel/barrel region 520 can help avoid the strength of the chanter from being compromised due to the longer neck region 518.

The extension of the neck region as a longer neck region can further reduce the stiffness at the upper portion/top part of the chimney section adding to the vibrancy of the tone especially on the top hand notes. Also, increasing the length of the neck region can reduce the mass of the material or reduces the total mass of the chanter. In addition, such a reduced mass can help to further aid/enhance the vibrancy.

Figure 12:
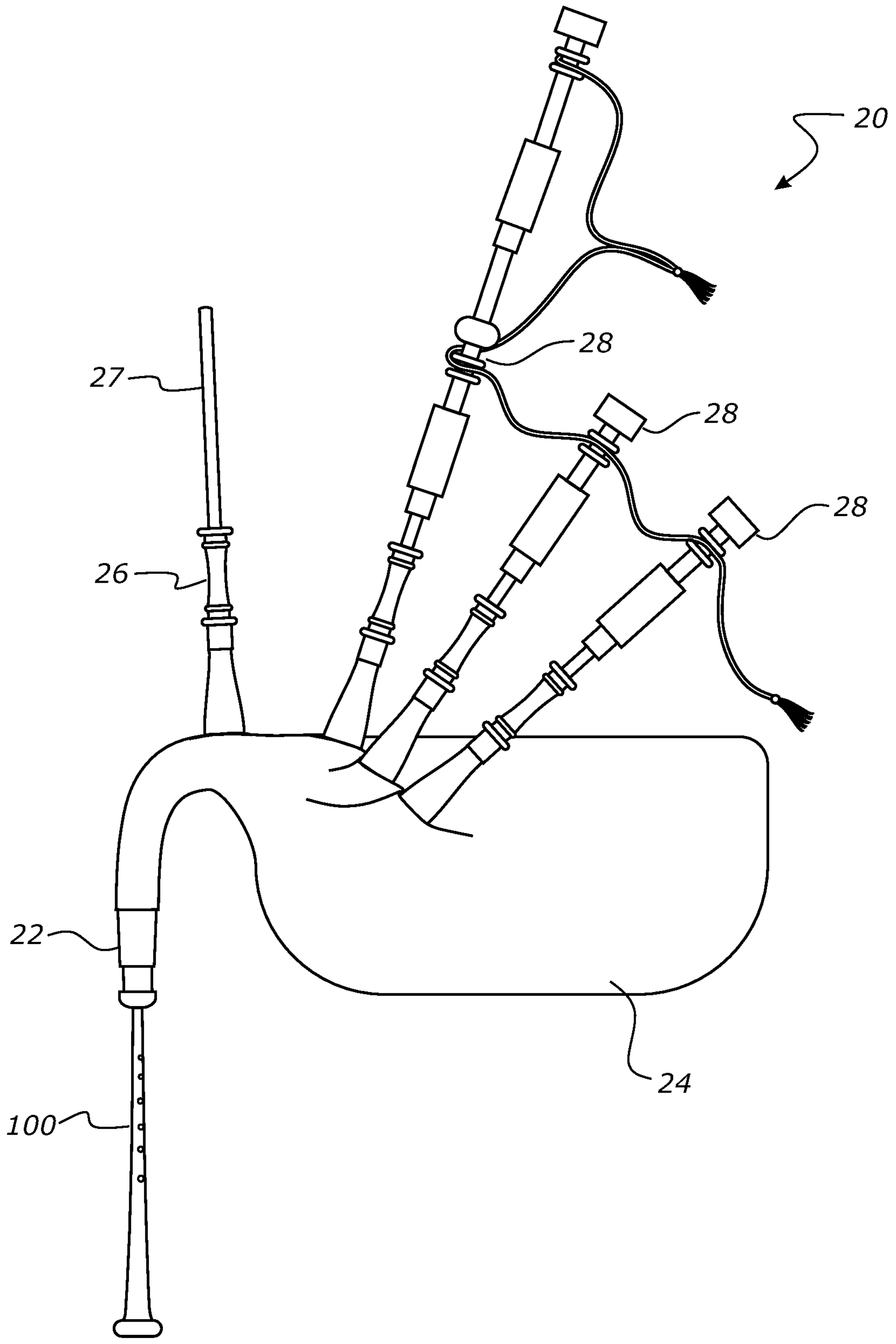
FIG. 12: shows a bagpipe comprising a chanter of FIG. 2.

FIG. 12 shows an example of a wind instrument in the form of a bagpipe 20 comprising the chanter 100 as described above. As shown, the bagpipe 20 comprises a chanter stock 22, bag 24, blowpipe 26, mouthpiece 27, and drone pipes 28. All such components and working principle of such components of the bagpipe 20 will be known to the person skilled in the art and therefore need not be described herein in detail. At least a portion of the top section 104 of the chanter 100 is coupled/sealingly engaged with the chanter stock 22 as shown in FIG. 12. It can be appreciated that instead of chanter 100, the bagpipe 20 may comprise chanter 200 or chanter 300 as described above. Similarly, it can be appreciated that instead of chanter 100, the bagpipe 20 may comprise chanter as described above with reference to FIGS. 10 and 11.

Figure 13:
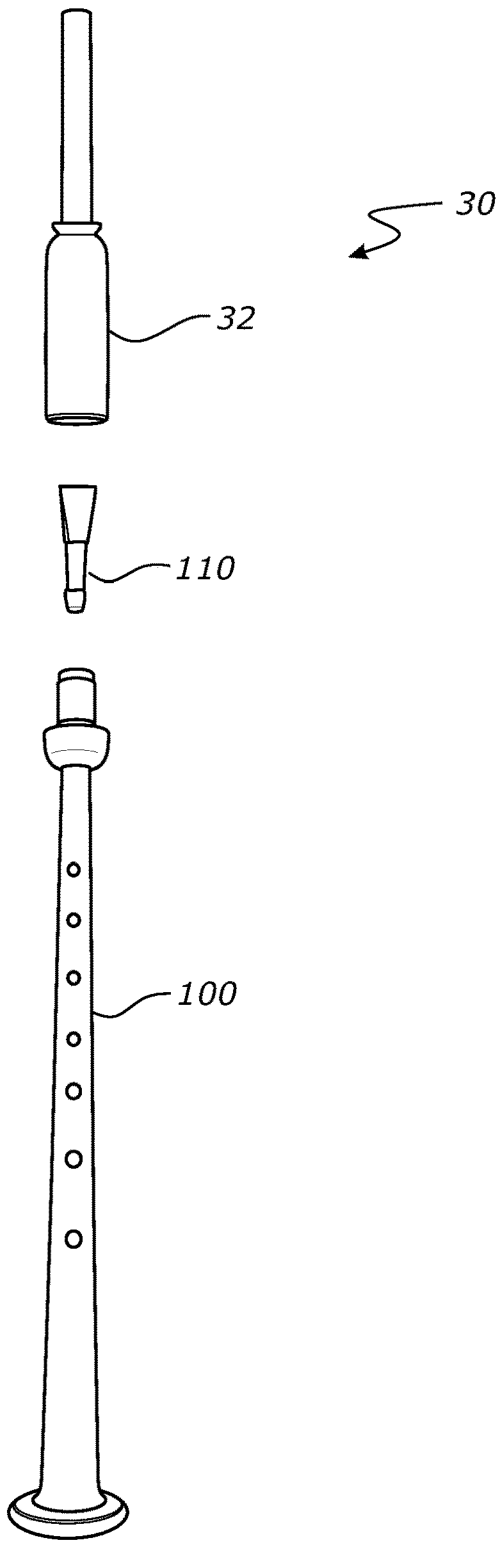
FIG. 13: shows an exploded practice chanter instrument comprising chanter of FIG. 2 and a mouth piece.

FIG. 13 shows an example of a wind instrument in the form of a practice chanter instrument 30 comprising the chanter 100 as described above. As shown, the practice chanter instrument 30 comprises a mouthpiece 32 with which at least a portion of the top section 104 of the chanter 100 may be coupled/sealing engaged. Components and working principle of such components of the practice chanter instrument 30 will be appreciated by the person skilled in the art and therefore need not be described herein in detail. It can be appreciated that instead of chanter 100, the practice chanter instrument 30 may comprise chanter 200 or chanter 300 as described above. Similarly, it can be appreciated that instead of chanter 100, the practice chanter instrument 30 may comprise chanter as described above with reference to FIGS. 10 and 11.

Therefore, it may be appreciated that the present invention may reside in a chanter 100, 200, 300 of a wind instrument. A chimney section 102, 202, 302 of the chanter 100, 200, 300 may be substantially tubular extending longitudinally from a first end portion 102*a*, 202*a*, 302*a* to a second end portion 102*b*, 202*b*, 302*b* or vice-versa. A blown air may be configured to be received by the chimney section 102, 202, 302 through the first end portion 102*a*, 202*a*, 302*a* and the second end portion 102*b*, 202*b*, 302*b* may be located opposite the first end portion 102*a*, 202*a*, 302*a*. The bulb 106, 206, 306 of the chanter 100, 200, 300 or at least a portion thereof may be located adjacent and around an external wall 102*b*, 202*b*, 302*b* of the chimney section 102,202, 302 and may be spaced apart from the chimney section 102*b*, 202*b*, 302*b* thereby forming a gap 115, 215, 315 around the external wall 102*b*, 202*b*, 302 of the chimney section 102, 202, 302 and at least a portion of an inner surface 106*a*, 206*a*, 306*a* of the bulb 106, 206, 306. Although, described with reference to the embodiments shown in FIGS. 2 to 9, the description in this paragraph may equally apply to the embodiments of chanter described with reference to FIGS. 10 and 11.

Thus, from the above, it can be appreciated that in one aspect, the present invention may reside in a bagpipe chanter. The chimney section may be substantially tubular (and/or has a hollow interior region that is a bore). The chimney section may extend longitudinally from a first end portion to a second end portion or vice-versa. The chimney section may be configured to receive a blown air through the first end portion. The second end portion may be configured to be located opposite the first end portion. A bulb of the chanter or at least a portion thereof may be located adjacent and around an external wall (external surface) of the chimney section and is spaced apart from the chimney section thereby forming/defining a gap around the external wall of the chimney section and at least a portion of an inner surface of the bulb.

Similarly, from the description above, it can be appreciated that the invention may reside in a chanter of a wind instrument in which a bulb of the chanter or at least a portion thereof may be located adjacent and around an external wall (external surface) of a chimney section of the chanter. At least a portion of the bulb may be spaced apart from the chimney section thereby forming or defining a gap or an empty space around the external wall of the chimney section and at least a portion of an internal surface of the bulb. The gap or the empty space may extend around the external wall of the chimney section and at least a portion of an internal surface of the a tenon of the chanter, the tenon may be coupled with or is integrally formed with the bulb.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A chanter of a wind instrument, the chanter comprising:

a chimney section that is substantially tubular and extends from a first end portion of the chimney section to a second end portion of the chimney section or vice-versa and has an internal wall and an external wall, the second end portion located opposite the first end portion; and a top section at which a chanter reed is located or is configured to be located, at least a portion of the top section is located adjacent and around an external wall of the chimney section, and is spaced apart from the chimney section thereby forming or defining a gap or an empty space between at least a portion of the external wall of the chimney section and at least a portion of an inner surface of the top section.

2. The chanter as claimed in claim 1, wherein the gap or the empty space extends from a lower end of the top section that is proximal to the second end portion towards the direction of an upper end of the top section that is proximal to the first end portion.

3. The chanter as claimed in claim 1, wherein the top section comprises or forms a bulb of a chanter, wherein the bulb or at least a portion thereof is located adjacent and around the external wall of the chimney section and is spaced apart from the chimney section so that the gap or the empty space is formed or defined around the external wall of the chimney section and at least a portion of an inner surface of the bulb.

4. The chanter as claimed in claim 1, wherein the chanter reed is configured to be located within a reed seat that is part of or is coupled with the top section.

5. The chanter as claimed in claim 1, wherein the chanter reed is a single reed or a double reed.

6. The chanter as claimed in claim 1, wherein the top section comprises or forms a tenon of the chanter that is located at or proximal to the first end portion of the chimney section.

7. The chanter as claimed in claim 1, wherein the external wall of the chimney section comprises a neck region at a portion that is adjacent to the gap or the empty region.

8. The chanter as claimed in claim 1, wherein the chanter or at least one or more components of the chanter is made out of carbon fibre.

9. The chanter as claimed in claim 1, wherein an internal and/or an external diameter of the chimney section tapers from the first end portion to or towards the second end portion.

10. The chanter as claimed in claim 7, wherein a further or a second empty space or second gap is formed at a lower portion of the neck region, the second empty space being in addition to a first empty space, the first empty space being the empty space or the gap.

11. The chanter as claimed in claim 10, wherein the second empty space is in the form of a cavity or a recess.

12. The chanter as claimed in claim 10, wherein the second empty space is formed at the chimney section between its internal wall and external wall.

13. The chanter as claimed in claim 10, wherein the second empty space extends along the longitudinal axis of the chimney section from a portion that is adjacent to the lower end of the top section towards the direction to the second end of the chimney section.

14. The chanter as claimed in claim 10, wherein the second empty space extends to only a part of total length of the chimney section.

15. The chanter as claimed in claim 10, wherein the second empty space merges with or is coalesce to the first empty space or the gap thereby forming a single empty space or a single gap.

16. The chanter as claimed in claim 10, wherein the second empty space is fully enclosed between the internal wall and the external wall of the chimney section.

17. The chanter as claimed in claim 10, wherein the second empty space is adjacent to the first empty space and extends parallel to the first empty space towards the direction to the second end of the chimney section.

18. The chanter as claimed in claim 10, wherein a barrel or barrel region is formed at a portion where the second empty space is formed.

19. A chanter of a wind instrument, the chanter comprises a chimney section, the chimney section of the chanter being substantially tubular or has a hollow interior region extending longitudinally from a first end portion of the chimney section to a second end portion of the chimney section or vice-versa, the chimney section is configured to receive a blown air through the first end portion, and the second end portion is located opposite the first end portion, wherein the chanter further comprises a bulb, the bulb of the chanter or at least a portion thereof is located adjacent and around an external wall of the chimney section and is spaced apart from the chimney section thereby forming or defining a gap or an empty space around at least a portion of the external wall of the chimney section and at least a portion of an internal wall of the bulb.

20. A chanter of a wind instrument, the chanter comprising a bulb and a chimney section, the bulb of the chanter or at least a portion thereof is located adjacent and around an external wall of the chimney section of the chanter, at least a portion of the bulb being spaced apart from the chimney section thereby forming or defining a gap or an empty space around the external wall of the chimney section and at least a portion of an internal surface of the bulb.

* * * * *